(12) United States Patent
Donelson et al.

(10) Patent No.: US 8,287,991 B2
(45) Date of Patent: Oct. 16, 2012

(54) USING BRANCHED POLYMERS TO CONTROL THE DIMENSIONAL STABILITY OF ARTICLES IN THE LAMINATION PROCESS

(75) Inventors: Michael Eugene Donelson, Gray, TN (US); Ryan Thomas Neill, Kingsport, TN (US); James Collins Maine, Church Hill, TN (US); Bryan Steven Bishop, Kingsport, TN (US); Robert Erik Young, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 1336 days.

(21) Appl. No.: 11/827,905

(22) Filed: Jul. 13, 2007

(65) Prior Publication Data

US 2009/0017320 A1 Jan. 15, 2009

(51) Int. Cl.
- B32B 27/14 (2006.01)
- B32B 27/36 (2006.01)
- B32B 37/16 (2006.01)
- B32B 37/24 (2006.01)
- B32B 5/16 (2006.01)

(52) U.S. Cl. ....... 428/200; 428/77; 428/195.1; 428/201; 428/203; 428/204; 428/206; 428/208; 428/209; 428/480; 428/542.2; 156/297; 156/298; 156/308.2; 156/309.6; 156/327; 528/296; 528/302; 528/307; 528/308; 528/308.6; 528/308.7

(58) Field of Classification Search .................. None
See application file for complete search history.

(56) References Cited

U.S. PATENT DOCUMENTS

| | | |
|---|---|---|
| 2,991,273 A | 7/1961 | Hechelhammer et al. |
| 2,999,835 A | 9/1961 | Goldberg |
| 2,999,846 A | 9/1961 | Schnell et al. |
| 3,028,365 A | 4/1962 | Schnell et al. |
| 3,148,172 A | 9/1964 | Fox |
| 3,153,008 A | 10/1964 | Fox |
| 3,169,121 A | 2/1965 | Goldberg |
| 3,207,814 A | 9/1965 | Goldberg |
| 3,271,367 A | 9/1966 | Schnell et al. |
| 3,396,067 A | 8/1968 | Schafer |

(Continued)

FOREIGN PATENT DOCUMENTS

DE 4 415 432 A1 11/1995

(Continued)

OTHER PUBLICATIONS

USPTO Office Action dated Dec. 23, 2010 for copending U.S. Appl. No. 11/827,696.
USPTO Office Action dated Jun. 8, 2011 for copending U.S. Appl. No. 11/827,696.
USPTO Office Action dated Apr. 5, 2011 for copending U.S. Appl. No. 11/876,305.
USPTO Office Action dated Oct. 21, 2011 for copending U.S. Appl. No. 11/876,305.

(Continued)

*Primary Examiner* — Vivian Chen
(74) *Attorney, Agent, or Firm* — Louis N. Moreno

(57) ABSTRACT

Disclosed are laminated articles comprising a first polymer layer and a second polymer layer having an inclusion embedded between the layers, wherein at least one layer comprises a branching agent to improve dimensional stability during the lamination process. Disclosed are laminated articles comprising a first polymer layer and a second polymer layer having an inclusion embedded between the layers, wherein at least one layer comprises a copolyester comprising a branching agent to improve dimensional stability during the lamination process. Also disclosed are methods of laminating a first layer and a second layer with an inclusion between the layers to form a laminated article with an embedded inclusion, wherein at least one layer comprises a copolyester comprising a branching agent.

32 Claims, 1 Drawing Sheet

AREA = L * W
INITIAL AREA = L * W (BEFORE LAMINATING)
FINAL AREA = L * W (AFTER LAMINATING)

U.S. PATENT DOCUMENTS

| | | | |
|---|---|---|---|
| 3,502,620 A * | 3/1970 | Caldwell | 525/437 |
| 3,546,008 A | 12/1970 | Shields et al. | |
| 3,734,874 A | 5/1973 | Kibler et al. | |
| 3,772,405 A | 11/1973 | Hamb | |
| 4,025,492 A | 5/1977 | Binsack et al. | |
| 4,029,837 A | 6/1977 | Leatherman | |
| 4,111,846 A | 9/1978 | Elliott, Jr. | |
| 4,123,436 A | 10/1978 | Holub et al. | |
| 4,136,089 A | 1/1979 | Bier et al. | |
| 4,156,069 A | 5/1979 | Prevorsek et al. | |
| 4,176,224 A | 11/1979 | Bier et al. | |
| 4,188,314 A | 2/1980 | Fox et al. | |
| 4,194,038 A | 3/1980 | Baker et al. | |
| 4,208,527 A | 6/1980 | Horlbeck et al. | |
| 4,217,440 A * | 8/1980 | Barkey | 528/274 |
| 4,228,209 A | 10/1980 | Chavannes | |
| 4,233,196 A | 11/1980 | Sublett | |
| 4,238,593 A | 12/1980 | Duh | |
| 4,289,818 A | 9/1981 | Casamayor | |
| 4,391,954 A | 7/1983 | Scott | |
| 4,430,484 A | 2/1984 | Quinn | |
| 4,433,070 A | 2/1984 | Ross et al. | |
| 4,452,933 A | 6/1984 | McCready | |
| 4,465,820 A | 8/1984 | Miller et al. | |
| 4,474,918 A | 10/1984 | Seymour et al. | |
| 4,503,023 A | 3/1985 | Breck et al. | |
| 4,544,584 A | 10/1985 | Ross et al. | |
| 4,733,488 A | 3/1988 | Yokoyama et al. | |
| 4,786,692 A | 11/1988 | Allen et al. | |
| 4,786,693 A | 11/1988 | Hefner, Jr. | |
| 4,918,156 A * | 4/1990 | Rogers | 528/272 |
| 4,946,932 A | 8/1990 | Jenkins | |
| 4,981,898 A | 1/1991 | Bassett | |
| 4,982,014 A | 1/1991 | Freitag et al. | |
| 5,010,162 A | 4/1991 | Serini et al. | |
| 5,051,654 A | 9/1991 | Nativi et al. | |
| 5,055,076 A | 10/1991 | Mori et al. | |
| 5,059,470 A * | 10/1991 | Fukuda et al. | 428/142 |
| 5,091,258 A | 2/1992 | Moran | |
| 5,228,925 A | 7/1993 | Nath et al. | |
| 5,286,290 A | 2/1994 | Risley | |
| 5,290,631 A | 3/1994 | Fleury et al. | |
| 5,413,840 A | 5/1995 | Mizuno | |
| 5,413,870 A | 5/1995 | Flood | |
| 5,442,036 A * | 8/1995 | Beavers et al. | 528/296 |
| 5,443,912 A | 8/1995 | Olson | |
| 5,445,871 A | 8/1995 | Murase | |
| 5,461,120 A * | 10/1995 | Mason et al. | 525/462 |
| 5,478,896 A | 12/1995 | Scott | |
| 5,480,926 A | 1/1996 | Fagerburg et al. | |
| 5,492,589 A | 2/1996 | Mizuno | |
| 5,543,488 A | 8/1996 | Miller et al. | |
| 5,552,495 A | 9/1996 | Miller et al. | |
| 5,583,394 A | 12/1996 | Burbank et al. | |
| 5,633,340 A * | 5/1997 | Hoffman et al. | 528/272 |
| 5,643,666 A | 7/1997 | Eckart et al. | |
| 5,646,237 A | 7/1997 | George et al. | |
| 5,654,347 A | 8/1997 | Khemani et al. | |
| 5,696,176 A | 12/1997 | Khemani et al. | |
| 5,709,929 A * | 1/1998 | Venema | 428/215 |
| 5,709,940 A | 1/1998 | George et al. | |
| 5,739,463 A | 4/1998 | Diaz et al. | |
| 5,742,006 A | 4/1998 | Grupp et al. | |
| 5,814,393 A | 9/1998 | Miyaake et al. | |
| 5,834,118 A | 11/1998 | Ranby et al. | |
| 5,894,048 A | 4/1999 | Eckart et al. | |
| 5,957,564 A | 9/1999 | Bruce et al. | |
| 5,958,539 A | 9/1999 | Eckart et al. | |
| 5,972,445 A | 10/1999 | Kimura et al. | |
| 5,998,028 A | 12/1999 | Eckart et al. | |
| 6,025,069 A | 2/2000 | Eckart et al. | |
| 6,043,322 A | 3/2000 | Scott et al. | |
| 6,136,441 A * | 10/2000 | MacGregor et al. | 428/412 |
| 6,162,890 A | 12/2000 | George et al. | |
| 6,214,155 B1 | 4/2001 | Leighton | |
| 6,322,862 B1 * | 11/2001 | Sakai | 428/13 |
| 6,637,906 B2 | 10/2003 | Knoerzer et al. | |
| 6,698,085 B2 | 3/2004 | Stevenson et al. | |
| 6,743,327 B2 * | 6/2004 | Schober | 156/309.6 |
| 6,803,110 B2 * | 10/2004 | Drees et al. | 428/423.7 |
| 6,896,966 B2 | 5/2005 | Crawford et al. | |
| 6,924,349 B2 * | 8/2005 | Lee et al. | 528/272 |
| 6,949,825 B1 | 9/2005 | Guenther et al. | |
| 7,008,700 B1 * | 3/2006 | Goodson et al. | 428/542.2 |
| 7,022,388 B2 | 4/2006 | Hashimoto et al. | |
| 7,074,501 B2 | 7/2006 | Czeremuszkin et al. | |
| 7,081,300 B2 * | 7/2006 | Laurence et al. | 428/423.7 |
| 7,118,799 B2 * | 10/2006 | Crawford et al. | 428/212 |
| 7,298,072 B2 | 11/2007 | Czeremuszkin et al. | |
| 7,510,768 B2 | 3/2009 | Crawford et al. | |
| 7,550,057 B1 * | 6/2009 | Goodson et al. | 156/312 |
| 7,704,605 B2 | 4/2010 | Crawford et al. | |
| 7,740,941 B2 | 6/2010 | Crawford et al. | |
| 7,906,211 B2 | 3/2011 | Crawford et al. | |
| 7,906,212 B2 | 3/2011 | Crawford et al. | |
| 2003/0152775 A1 | 8/2003 | Gorny et al. | |
| 2004/0053040 A1 * | 3/2004 | Goodson et al. | 428/326 |
| 2004/0101678 A1 | 5/2004 | Crawford et al. | |
| 2004/0101687 A1 | 5/2004 | Crawford et al. | |
| 2004/0209020 A1 | 10/2004 | Castiglione et al. | |

FOREIGN PATENT DOCUMENTS

| | | |
|---|---|---|
| EP | 0 271 288 A2 | 6/1988 |
| EP | 0 408 042 A2 | 1/1991 |
| EP | 0 587 353 A1 | 3/1994 |
| EP | 0 595 413 A1 | 5/1994 |
| FR | 2 467 691 A1 | 4/1981 |
| GB | 1 356 004 | 6/1974 |
| GB | 2 344 596 A | 6/2000 |
| JP | 052338 | 2/1997 |
| WO | WO 94 25502 A1 | 11/1994 |
| WO | WO 01/53393 A1 | 7/2001 |
| WO | WO 02/068511 A1 | 9/2002 |

OTHER PUBLICATIONS

ASTM D-1238; "Standard Test Method for Melt Flow Rates of Thermoplastics by Extrusion Plastometer", (2004).

Wilfrong, R.E.; "Linear Polyesters"; Journal of Polymer Science; vol. 54, pp. 385-410 (1961).

Mohn, R.N., et al.; "Polyester-Polycarbonate Blends. III. Polyesters Based on 1,4-Cyclohexanedimethanol/Terephthalic Acid/Isophthalic Adic"; Journal of Applied Polymer Science, vol. 23, 575-587 (1979).

Research Disclosure 22921, May 1983, Disclosed Anonymously (209,136).

Copending U.S. Appl. No. 11/827,696, filed Jul. 13, 2007, Ryan Thomas Neill, et al.

Copending U.S. Appl. No. 11/876,305, filed Oct. 22, 2007, Ryan Thomas Neill, et al.

Notification of Transmittal of the International Search Report and the Written Opinion of the International Searching Authority, or the Declaration, filed Sep. 27, 2007 (PCT/US2007/020859).

Notification of Transmittal of the International Search Report and the Written Opinion of the International Searching Authority, or the Declaration, filed Sep. 27, 2007 (PCT/US2007/020869).

Notification of Transmittal of the International Search Report and the Written Opinion of the International Searching Authority, or the Declaration, for International Application No. PCT/US2008/011727 with Date of Mailing Feb. 13, 2009.

ASTM D1003; "Standard Test Method for Haze and Luminous Transmittance of Transparent Plastics", (2000).

ASTM G155; "Standard Practice for Operating Xenon Arc Light Apparatus for Exposure of Non-Metallic Materials", (2005).

Copending U.S. Appl. No. 12/361,779, filed Jan. 29, 2009, Emmett Dudley Crawford, et al.

ASTM D256; "Standard Test Methods for Determining the Izod Pendulum Impact Resistance of Plastics", (2006).

ASTM D3418; "Standard Test Method for Transition Temperatures and Enthalpies of Fusion and Crystallization of Polymers by Differential Scanning Calorimetry", (2004).

USPTO Office Action dated Mar. 6, 2012 for copending U.S. Appl. No. 11/827,696.

* cited by examiner

AREA = L * W
INITIAL AREA = L * W (BEFORE LAMINATING)
FINAL AREA = L * W (AFTER LAMINATING)

USING BRANCHED POLYMERS TO CONTROL THE DIMENSIONAL STABILITY OF ARTICLES IN THE LAMINATION PROCESS

FIELD OF INVENTION

The invention relates to laminated article with embedded inclusions and methods of making the laminated articles. More particularly, the invention relates to laminated articles, with embedded inclusions, having at least two polymer layers with at least one layer comprising a branching agent, and to methods of making the same. Further the invention relates to laminated articles comprising at least one copolyester layer comprising a branching agent and to methods of making the same.

BACKGROUND OF THE INVENTION

Lamination is a common process for adhering films and sheets of various plastics, for example copolyesters. Typical film and sheet layers range in thickness from as thin as 0.5 mils to 1 inch, but thinner and thicker are possible. Typically branched polymers are used for processes that require high melt strength, for example, blown film, extrusion blow molding, and profile extrusion processes, in order to have a very high zero shear viscosity such that the material has melt integrity to minimize sagging under its own weight. In contrast, press lamination is typically completed at lower temperatures and the material is being heated while being supported. The temperatures for lamination are typically 20 to 60° C. above the glass transition temperature of polymer. The temperature is set to minimize flow of the polymer during the press lamination process while allowing the material in the different layers to achieve good adhesion. These press lamination processes are very dissimilar to processes compared to other processes, such as blown film or extrusion blow mold, in which branching agents are used typically at 100 to 200° C. above the glass transition temperature. Higher processing temperatures typically result in much less viscous polymer under the process conditions.

There exist a need for methods to form laminated article having embedded inclusions under conditions that reduce cycle time and improve dimensional stability of the polymer sheets during the lamination process.

BRIEF SUMMARY OF THE INVENTION

Improved dimensional stability during laminating is desirable to decrease the lamination cycle time and minimize appearance changes to inclusions. Modification of flow behavior can be done by techniques such as a reduction in temperature. However, reducing the temperature results in less entanglement of the polymers at the interface of the laminated sheets. The lower temperature results in reduced adhesion and longer cycle times as the materials have to heat to near or above the glass transition temperature (Tg) to achieve adequate adhesion. We have found that using branched agents reduce dimensional changes during the lamination process while permitting sufficient mobility of the copolyester to achieve adhesion between the layers.

In one aspect the invention relates to methods of making a laminated article comprising providing a first layer and a second layer, each layer independently comprising a copolyester layer wherein at least one layer further comprises a branching agent, providing an inclusion between the first and second layer, applying pressure ranging from about 20 to about 400 psig at a temperature ranging from about 20° C. to about 80° C. above the glass transition (Tg) of at least one layer of the copolyester for a period of time ranging from about 0.5 minutes to about 120 minutes to form the laminated article, wherein the temperature at an interface of the first layer and the second layer is equal to or greater than the Tg of at least one of the first layer and the second layer, and wherein the copolyester has an inherent viscosity (IV) ranging from about 0.5 to about 1.2 dL/g, when measured at 25° C. using 0.50 grams of polymer per 100 mL of a solvent consisting of 60 weight percent phenol and 40 weight percent tetrachloroethane.

In one aspect the invention relates to methods of making a laminated article comprising providing a first layer and a second layer, each layer independently comprising a copolyester layer wherein at least one layer further comprises a branching agent, applying pressure ranging from about 20 to about 400 psig at a temperature ranging from about 20° C. to about 80° C. above the glass transition (Tg) of at least one layer of the copolyester for a period of time ranging from about 0.5 minutes to about 120 minutes to form the laminated article, wherein the temperature at an interface of the first layer and the second layer is equal to or greater than the Tg of at least one of the first layer and the second layer, and wherein the copolyester has an inherent viscosity (IV) ranging from about 0.5 to about 1.2 dL/g, when measured at 25° C. using 0.50 grams of polymer per 100 mL of a solvent consisting of 60 weight percent phenol and 40 weight percent tetrachloroethane.

In one aspect the invention relates to methods comprising providing a first layer comprising a polycarbonate polymer comprising a branching agent and a second layer comprising a polymer selected from the group consisting of a copolyester, a polyacrylate, a polyester/polycarbonate miscible blend layer, providing an inclusion between the first and second layer, applying pressure ranging from about 20 to about 400 psig at a temperature ranging from about 20° C. to about 80° C. above the glass transition (Tg) of at least one layer of the copolyester, wherein the temperature at an interface of the first layer and the second layer is equal to or greater than the Tg of at least one of the first layer and the second layer and the temperature is maintained for a period of time sufficient to form the laminated article.

In one aspect the invention relates to methods of making laminated articles, the methods comprising providing a first layer comprising a blend of polymers selected from polyesters, polycarbonates, polyacrylates, polyester/polycarbonate miscible blends wherein at least one polymer in the blend comprises a branching agent and a second layer comprising a polymer selected from the group consisting of a copolyester, a polyacrylate, a polyester/polycarbonate miscible blend layer, providing an inclusion between the first and second layer, applying pressure ranging from about 20 to about 400 psig at a temperature ranging from about 20° C. to about 80° C. above the glass transition (Tg) of at least one layer of the copolyester, wherein the temperature at an interface of the first layer and the second layer is equal to or greater than the Tg of at least one of the first layer and the second layer and the temperature is maintained for a period of time sufficient to form the laminated article.

In one aspect, the invention relates to laminated articles made using any of the methods listed above.

In one aspect the invention relates to laminated articles comprising a first layer and a second layer, each layer independently comprising a copolyester layer wherein at least one layer further comprises a branching agent, an inclusion embedded between the first and second layer, wherein the article is obtained by applying pressure ranging from about 20 to about 400 psig at a temperature ranging from about 20° C. to about 80° C. above the Tg of at least one layer for a period of time ranging from about 0.5 minutes to about 120 minutes to form the laminated article, and wherein the temperature at an interface, during lamination, of the first layer and the second layer is equal to or greater than the Tg of at least one of the first layer and the second layer.

In certain embodiments of the present invention, each copolyester layer further comprises a branching agent.

In certain embodiments of the present invention, the first layer and the second layer increase in width and/or length less than 5% relative to similar copolyester layers without the branching agent during the lamination.

In certain embodiments of the present invention, the temperature at an interface of the first layer and the second layer is equal to or greater than the Tg of the first layer and the second layer.

In certain embodiments of the present invention, the copolyester comprises diacid residues comprising at least 80 mole percent terephthalic acid residues; and diol residues comprising from 98 to 1 mole percent ethylene glycol residues and from 2 to 99 mole percent residues derived from 1,3- or 1,4-cyclohexanedimethanol, wherein the ethylene glycol and cyclohexanedimethanol residues constitute at least 80 mole percent of the diol residues.

In certain embodiments of the present invention, the copolyester comprises a dicarboxylic acid component comprising repeat units from at least 80 mole % of terephthalic acid or dimethyl terephthalate; and a diol component comprising repeat units from 98 to 1 mole % ethylene glycol and 2 to 99 mole % cyclohexanedimethanol, based on 100 mole % dicarboxylic acid and 100 mole % diol.

In certain embodiments of the present invention, the copolyester comprises a dicarboxylic acid component comprising repeat units from at least 80 mole percent of terephthalic acid or dimethyl terephthalate; and a diol component comprising repeat units from ethylene glycol and 2 to 99 mole percent of cyclohexanedimethanol, based on 100 mole percent dicarboxylic acid and 100 mole percent diol.

In certain embodiments of the present invention, the copolyester comprises diacid residues comprising at least 80 mole percent terephthalic acid residues; and diol residues comprising from 98 to 1 mole percent ethylene glycol residues and from 2 to 99 mole percent residues derived from 1,3- or 1,4-cyclohexanedimethanol in which the ethylene glycol and cyclohexanedimethanol residues constitute at least 80 mole percent of the diol residues.

In certain embodiments of the present invention, the copolyester comprises diacid residues consisting essentially of terephthalic acid residues; and diol residues consisting essentially of ethylene glycol residues and 1,4-cyclohexanedimethanol residues wherein the mole ratio of ethylene glycol residues: 1,4-cyclohexanedimethanol residues is about 10:90 to about 90:10, wherein the copolyester has an inherent viscosity of 0.5 to 1.2 dL/g, when measured at 25° C. using 0.50 grams of polymer per 100 mL of a solvent consisting of 60 weight percent phenol and 40 weight percent tetrachloroethane.

In certain embodiments of the present invention, the copolyester comprises a dicarboxylic acid component comprising repeat units from at least 80 mole percent of terephthalic acid or dimethyl terephthalate; and a diol component comprising repeat units from 1 to 99 mole percent ethylene glycol, 1 to 99 mole percent of cyclohexanedimethanol and 1 to 99 mole percent of neopentyl glycol, based on 100 mole percent dicarboxylic acid and 100 mole percent diol.

In certain embodiments of the present invention, the copolyester comprises a dicarboxylic acid component comprising repeat units from at least 80 mole percent of terephthalic acid or dimethyl terephthalate; and a diol component comprising neopentyl glycol, based on 100 mole percent dicarboxylic acid and 100 mole percent diol.

In certain embodiments of the present invention, the copolyester comprises a dicarboxylic acid component comprising repeat units from at least 80 mole percent of terephthalic acid or dimethyl terephthalate; and a diol component consisting essentially of neopentyl glycol, based on 100 mole percent dicarboxylic acid and 100 mole percent diol.

In one aspect of the present invention, the branching agent comprises a multifunctional acid or multifunctional alcohol having at least three acid or alcohol groups or a combination of acid and alcohol groups including, but not limited to, trimesic acid, trimellitic acid, citric acid, tartaric acid, trimellitic anhydride, pyromellitic dianhydride, trimethylolpropane, glycerol, pentaerythritol, citric acid, tartaric acid, 3-hydroxyglutaric acid or mixtures thereof. In another aspect the branching agent comprises an epoxide, including, but not limited to, glycidyl methacrylate. In another aspect the branching agent comprises a dendritic polymer having at least three reactive functional groups such as carboxylic acids, hydroxyl or combinations thereof.

In certain embodiments of the present invention, the inclusion comprises fabric, metallic wire, rod, bar, wood, stone, paper, printed images, photographic images, vegetation, wood, wood chips, grasses, thatch, flowers, bamboo, tree or bush branches or stems, willow reed leaves, beans, flower petals, wheat, grains, papers, glass, crushed glass, glass fibers, mineral fibers, natural fibers, pebbles or combinations thereof.

In one aspect the invention relates to methods of making a laminated article comprising providing a first layer comprising a copolyester layer and at least one layer further comprising a branching agent and a second layer comprising a polycarbonate, a polyacrylate, or a polycarbonate/polyester miscible blend, providing an inclusion between the first and second layer, applying pressure ranging from about 20 to about 400 psig at a temperature ranging from about 20° C. to about 80° C. above the glass transition (Tg) of the copolyester for a period of time ranging from about 0.5 minutes to about 120 minutes to form the laminated article, wherein the temperature at an interface of the first layer and the second layer is equal to or greater than the Tg of the first layer, and wherein the copolyester has an inherent viscosity (IV) ranging from about 0.5 to about 1.2 dL/g, when measured at 25° C. using 0.50 grams of polymer per 100 mL of a solvent consisting of 60 weight percent phenol and 40 weight percent tetrachloroethane.

In one aspect the invention relates to laminated articles comprising a first layer comprising a copolyester layer comprising a branching agent, a second layer comprising a polycarbonate, a polyacrylate, a polycarbonate/polyester miscible blend, an inclusion embedded between the first and second layer, wherein the article is obtained by applying pressure ranging from about 20 to about 400 psig at a temperature ranging from about 20° C. to about 80° C. above the Tg of the copolyester layer for a period of time ranging from about 0.5 minutes to about 120 minutes to form the laminated article, and wherein the temperature at an interface, during lamination, of the first layer and the second layer is equal to or greater than the Tg of the copolyester layer.

DETAILED DESCRIPTION

Figure 1:
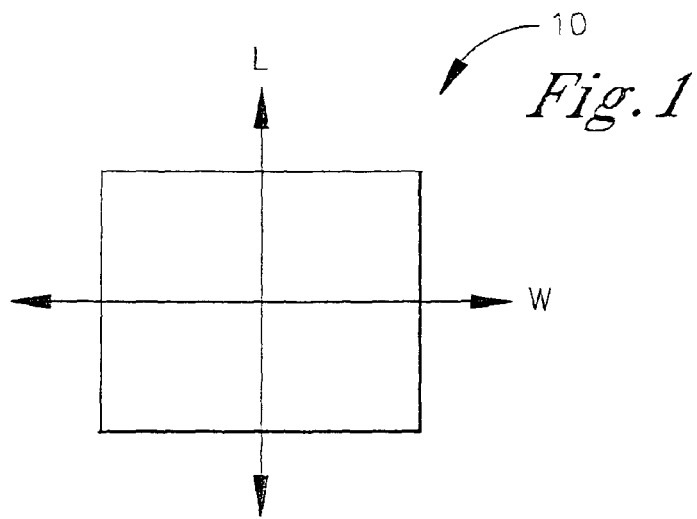
FIG. 1 is a top view of half of an encapsulation layup stack.

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The present invention relates to thermoplastic articles containing or comprising a branching agent to reduce undesirable flow during the lamination processes and methods of making the laminated articles. The use of branching agents unexpectedly permits sufficient flow for the lamination processes described herein. Previously it was believed that the use of branching agents in lamination processes, as described herein, would have required temperatures, pressures and/or cycle times that would have been prohibitive for economic reasons or because of damage to the laminated articles or inclusions.

The reduction in flow of the first layer and the second layer of inventive articles, as measured by the change of area of the layers, decrease more than about 7% or about 10% or about 15% or about 25% or about 27% or about 30% or about 33% or about 35% or about 36% or about 40% or about 42% or about 50% or about 52% or about 55% or about 60% or about 65% or about 70% or about 75% or about 78% or about 80% or about 85% or about 90% or about 95% or about 100% or about 105% or about 108% relative to similar copolyester layers without the branching agent during the lamination. The reduction in flow is determined by measuring the area of the sheets prior to lamination and after lamination. The change in area for the sheets with the branching agent is subtracted from the area for the sheets without the branching agent and the difference is divided by the change in area for the sheets with the branching agent.

Reduction in flow (%)=[Change in area of sheet without branching agent−Change in area of sheet with branching agent]/Change in area of sheet with branching.

In one aspect the invention relates to branching agents comprising about 0.05 to about 0.75 wt %, or about 0.5 to about 0.50 wt %, or about 0.5 to about 0.25 wt % of the polyester layer, based on the total weight of the polyester layer.

Examples of branching monomers include, but are not limited to, multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. In addition, reactive epoxies such as glycidyl methacrylate may also be used. And in addition, dendritic polymers can be added for improved branching. In addition to branching, flow behavior is controlled by chain length and composition. Previously chain length has been reported as inherent viscosity of 0.5 to 1.2 dL/g, when measured at 25° C. using 0.50 grams of polymer per 100 mL of a solvent consisting of 60 weight percent phenol and 40 weight percent tetrachloroethane.

For purposes of convenience the laminated articles and methods of making the laminated articles are generally described in terms of two layers encapsulating an inclusion. However, it is understood that the inventions and claims thereto encompass laminated articles having more than two layers. A typical thermocompressive lamination procedure might include placing the "book" with articles to be laminated in a heated press with platen temperatures of about 120° C. and a pressure of about 75 pounds per square inch for a cycle time of about 2 to 90 minutes, where the temperature and pressure depend on the characteristics of the encapsulant or inclusion and length of the cycle time depends on the thickness of the article being laminated and the total number of articles being laminated when stacked together in one press opening. A typical layup for the book would include the following layered arrangement (from the bottom, upward): a metallic transfer plate, a pressure distribution pad (rubber silicone, paper, corrugation, thermally-stable fabric, etc.), a thin, polished metallic plate, release film or paper, copolyester plastic sheeting with matte surface upward, decorative or functional layer to be encapsulated and repeating the layers in reverse to complete the layup to make one laminated structure. Note that a book can be constructed such that several laminates are manufactured in one press opening. Also note that those skilled in the art can describe several variations to the above example.

Another embodiment of the present invention involves clear thermoplastic articles with branching agents where flow from exposure to heat is undesirable where the articles include, but are not limited to, decorative laminates, functional laminates, thermoformed articles, drape formed articles, articles that have post-manufacturing fabrication (such as edge or surface polishing with a micro torch, a heat gun, and the like), or articles that require sterilization, and the like.

The decorative and functional laminates may include adhesion to the surface of one or more, or encapsulation between two or more, layers of clear thermoplastic film or sheet where the article to be adhered or encapsulated include, but is not limited to, fabric, metallic wire, rod, bar, wood, stone, paper, printed images, colored film, vegetation, wood, wood chips, grasses, thatch, flowers, flower petals, wheat, grains, natural papers, glass, crushed glass, pebbles, and the like.

These products are intended for use primarily as decorative or functional articles which include, but are not limited to, counter tops, table tops, cabinet doors, game boards, toys, panels for shower stalls, hot tubs, marker boards, indoor and outdoor signs, vanity tops including sink, soap dish, back splash, flooring, billboard signage, backlit bus advertisement, street furniture, bus shelters, POP (point-of-purchase) displays, flooring, kiosks, smart sensors, decorative walls, partitions, glazing applications and the like.

A typical thermoforming operation might include clamping a sheet of copolyester plastic sheeting to a frame, sliding this frame into an oven, allowing the sheet to heat until the surface temperature reached about 140° C. or until the degree of sag in the middle of the sheet becomes about 10 inches, pulling the hot sheet out of the oven and stretching the sheet over a mold, applying vacuum to obtain a satisfactory shape and cooling the form with forced-circulated air from a fan until the temperature reaches about 55° C. Note that those skilled in the art can describe several variations to the above example.

A typical drape-forming operation would include clamping a sheet of copolyester plastic sheeting to a frame, sliding this frame into an oven, allowing the sheet to heat until the surface temperature reached about 140° C. or until the degree of sag in the middle of the sheet becomes about 10 inches, pulling the hot sheet out of the oven and allowing the weight of the hot sheet to stretch over a mold and cooling the form with forced-circulated air from a fan until the temperature reaches about 55° C. Note that those skilled in the art can describe several variations to the above example.

A typical in-line lamination procedure might include placing a roll of branched film downstream of the roll stack of an extruder making film or sheet, feeding the branched film onto the second or middle roll for an upward-oriented roll stack setup, where adhesion occurs due to the hot of molten outer surface of the film or sheet being extruded being exposed. Note that those skilled in the art can describe several variations to the above example.

A typical fabrication step that might require an elevated temperature might include polishing the edge of a cut sheet of plastic to achieve a glass-like aesthetic surface by moving the tip of the flame from a butane micro torch about 1 inch away from the surface to be polished with a travel rate of about 1 inch per second along the edge to be polished. Several passes may be needed. Likewise, a heat gun with force-circulated hot air can also be used, where the surface of interest could include either the edge and/or the surface. Note that those skilled in the art can describe several variations to the above example.

A typical sterilization process might include taking a film or article, laying it in a metallic mesh basket, inserting the basket into an autoclave at 121° C., holding the part at temperature for 15 minutes and then cooling the part. Note that those skilled in the art can describe several variations to the above example.

The thermoformed, drape formed or molded articles include, but are not limited to, the aforementioned decorative or functional laminates, skylights, bus shelters, street furniture, decorative glazings, medical articles, and the like.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds. Typically the difunctional carboxylic acid can be a dicarboxylic acid and the difunctional hydroxyl compound can be a dihydric alcohol such as, for example, glycols and diols. The term "glycol" as used in this application includes, but is not limited to, diols, glycols, and/or multifunctional hydroxyl compounds. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, or mixtures thereof. Furthermore, as used in this application, the term "diacid" includes multifunctional acids such as branching agents. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself and residues thereof as well as any derivative of terephthalic acid, including its associated acid halides, esters, half-esters, salts, half-salts, anhydrides, mixed anhydrides, or mixtures thereof or residues thereof useful in a reaction process with a diol to make polyester.

In one embodiment of the invention suitable polyesters include copolyesters commercially available from Eastman Chemical Company as PETG Spectar™ Copolyester. These copolyesters comprise repeating units of diacid residues and diol residues. At least 80 mole percent of the diacid residues are terephthalic acid residues. The diacid component of the copolyesters optionally may comprise up to 20 mole percent of one or more other dicarboxylic acid such that the sum of the dicarboxylic acid units is equal to 100 mol percent. Examples of such other dicarboxylic acids include phthalic acid, isophthalic acid, 1,4-, 1,5-, 2,6- or 2,7-naphthalenedicarboxylic acid, 1,3- or 1,4-cyclohexanedicarboxylic acid (which may be cis, trans or a mixture thereof, cyclohexanediacetic acid, trans-4,4'-stilbenedicarboxylic acid, 4,4'-oxydibenzoic acid, 3,3'- and 4,4'-bi-phenyldicarboxylic acids and aliphatic dicarboxylic acids such as malonic, succinic, glutaric, adipic, pimelic, suberic, azelaic, sebacic, nonane, decane, and dodecanedicarboxylic acids. The "residue" of the dicarboxylic acids described herein is that portion of the diacid which constitutes a portion of a diester of the diacid. The diacid residues may be derived from the dicarboxylic acid, dialkyl esters thereof, e.g., dimethyl terephthalate and bis(2-hydroxyethyl)terephthalate, acid chlorides thereof and, in some cases, anhydrides thereof.

In one embodiment of the present invention, the diol component of the copolyesters comprises from 98 to 1 mole percent ethylene glycol residues and 2 to 99 mol percent 1,3-cyclohexanedimethanol and/or 1,4-cyclohexanedimethanol. Up to 20 mole percent of the diol component may be made up of the residues of one or more diols other than ethylene glycol and cyclohexanedimethanol such that the sum of all diol residues is 100 mole percent. Examples of such additional diols include cycloaliphatic diols having 3 to 16 carbon atoms and aliphatic diols having 3 to 12 carbon atoms. Specific examples of such other diols include, but are not limited to, 1,2-propanediol, 1,3-propanediol, neopentyl glycol, 2-methyl-1,3-propanediol, 1,4-butanediol, 1,5-pentanediol, 1,6-hexanediol, 2,2,4,4-tetramethyl-1,3-cyclobutanediol (trans-, cis- or mixtures thereof), and p-xylylene glycol. The copolyesters also may be modified with minor amounts of polyethylene glycols or polytetramethylene glycols to enhance elastomeric behavior, e.g., polyethylene glycols and polytetramethylene glycols having weight average molecular weights in the range of about 500 to 2000. In one embodiment of the present invention, the diol component of the copolyesters consists essentially of residues of ethylene glycol and 1,4-cyclohexanedimethanol wherein the mole ratio of ethylene glycol residues:1,4-cyclohexanedimethanol residues is about 5:95 to about 95:5, or preferably about 38:62 to about 88:12, or more preferably about 50:50 to about 77:23.

In one embodiment of the invention, the diol portion of the polyester comprises ethylene glycol and 1,4- or 1,3-cyclohexanedimethanol (cis-, trans-, and mixtures thereof). In another embodiment of the invention, the diol portion of the polyester consists essentially of ethylene glycol and 1,4- or 1,3-cyclohexanedimethanol (cis-, trans-, and mixtures thereof). In one embodiment of the invention, the diol portion of the polyester comprises neopentyl glycol and 1,4- or 1,3-cyclohexanedimethanol (cis-, trans-, and mixtures thereof. In another embodiment of the invention, the diol portion of the polyester consists essentially of neopentyl glycol and 1,4- or 1,3-cyclohexanedimethanol (cis-, trans-, and mixtures thereof). In one embodiment of the invention, the diol portion of the polyester comprises ethylene glycol and 2-methyl-1,3-propanediol. In another embodiment of the invention, the diol portion of the polyester consists essentially of ethylene glycol and 2-methyl-1,3-propandediol. In one embodiment of the invention, the diol portion of the polyester comprises ethylene glycol and neopentyl glycol. In another embodiment of the invention, the diol portion of the polyester consists essentially of ethylene glycol and neopentyl glycol. In another embodiment of the invention, the diol portion of the polyester comprises 1,3- and 1,4-cyclohexanedimenthanol (cis-, trans-, and mixtures thereof) and 2-methyl-1,3-propandediol. In another embodiment of the invention, the diol portion of the polyester consists essentially of 1,3- and 1,4-cyclohexanedimenthanol (cis-, trans-, and mixtures thereof) and 2 -methyl-1,3-propandediol. In another embodiment of the invention, the diol portion of the polyester comprises neopentyl glycol and 2-methyl-1,3-propandediol. In another embodiment of the invention, the diol portion of the polyester consists essentially of neopentyl glycol and 2-methyl-1,3-propandediol.

Polycarbonates useful in certain embodiments of this invention comprise the divalent residue of dihydric phenols bonded through a carbonate linkage and are represented by structural formulae I and II.

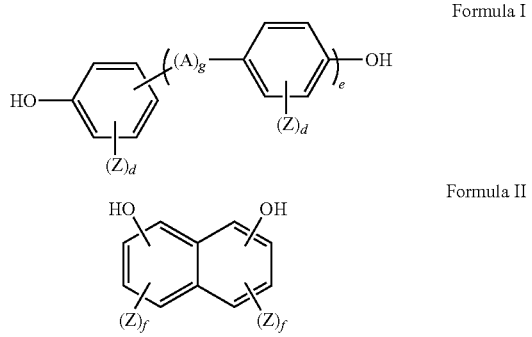

Formula I

Formula II wherein:
A denotes an alkylene group with 1 to 8 carbon atoms; an alkylidene group with 2 to 8 carbon atoms; a cycloalkylene group with 5 to 15 carbon atoms; a cycloalkylidene group with 5 to 15 carbon atoms; a carbonyl group; an oxygen atom; a sulfur atom; —SO— or —SO2; or a radical conforming to e and g both denote the number 0 to 1; Z denotes F, Cl, Br or C1-4.alkyl; and if several Z radicals are substituents in one aryl radical, they may be identical or different from one another; d denotes an integer of from 0 to 4; and f denotes an integer of from 0 to 3.

By the term "alkylene" is meant a bivalent saturated aliphatic radical wherein the two valences are on different carbon atoms, e.g., ethylene; 1,3-propylene; 1,2-propylene; 1,4-butylene; 1,3-butylene; 1,2-butylene, amylene, isoamylene, etc. By the term "alkylidene" is meant a bivalent radical wherein the two valences are on the same carbon atoms, e.g., ethylidene, propylidene, isopropylidine, butylidene, isobutylidene, amylidene, isoamylidene, 3,5,5,-trimethylhexylidene. Examples of "cycloalkylene" are cyclopropylene, cyclobutylene, and cyclohexylene. Examples of "cycloalkylidene" are cyclopropylidene, cyclobutylidene, and cyclohexylidene. Examples of C1-4 alkyl are methyl, ethyl, propyl, isopropyl, butyl, and isobutyl.

Typical of some of the dihydric phenols employed are bis-phenols such as 2,2-bis-(4-hydroxyphenyl)-propane (bisphenol A), 3,3,5-trimethyl-1,1-bis(4-hydroxyphenyl)-cyclohexane, 2,4-bis-(4-hydroxyphenyl)-2-methyl-butane, 1,1-bis-(4-hydroxyphenyl)-cyclohexane, alpha, alpha'-bis-(4-hydroxyphenyl)-p-diisopropylbenzene, 2,2-bis-(3-methyl-4-hydroxyphenyl)-propane, 2,2-bis-(3-chloro-4-hydroxyphenyl)propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, alpha, alpha'-bis-(3,5-dimethyl-4-hydroxyphenyl)-p-diisopropylbenzene and 4,4'-sulfonyl diphenol. Other dihydric phenols might include hydroquinone, resorcinol, bis-(hydroxyphenyl)-alkanes, bis-(hydroxyphenyl)ethers, bis-(hydroxyphenyl)-ketones, bis-(hydroxyphenyl)-sulfoxides, bis-(hydroxyphenyl)-sulfides, bis-(hydroxyphenyl)-sulfones, and alpha, alpha-bis-(hydroxyphenyl)diisopropylbenzenes, as well as their nuclear-alkylated compounds. These and further suitable dihydric phenols are described, for example, in U.S. Pat. Nos. 2,991,273; 2,999,835; 2,999,846; 3,028,365; 3,148,172; 3,153,008; 3,271,367; 4,982,014; 5,010,162 all incorporated herein by reference. The polycarbonates of the invention may entail in their structure, units derived from one or more of the suitable bisphenols. The most preferred dihydric phenol is 2,2-bis-(4-hydroxyphenyl)-propane (bisphenol A).

The carbonate precursors are typically a carbonyl halide, a diarylcarbonate, or a bishaloformate. The carbonyl halides include, for example, carbonyl bromide, carbonyl chloride, and mixtures thereof. The bishaloformates include the bishaloformates of dihydric phenols such as bischloroformates of 2,2-bis(4-hydroxyphenyl)-propane, hydroquinone, and the like, or bishaloformates of glycol, and the like. While all of the above carbonate precursors are useful, carbonyl chloride, also known as phosgene, and diphenyl carbonate is preferred.

The aromatic polycarbonates can be manufactured by any processes such as by reacting a dihydric phenol with a carbonate precursor, such as phosgene, a haloformate or carbonate ester in melt or solution. Suitable processes are disclosed in U.S. Pat. Nos. 2,991,273; 2,999,846; 3,028,365; 3,153,008; 4,123,436; all of which are incorporated herein by reference.

In certain embodiments of the present invention, the polycarbonates have a weight average molecular weight, as determined by gel permeation chromatography, of about 10,000 to 200,000, preferably 15,000 to 80,000 and their melt flow index, per ASTM D-1238 at 300° C. is about 1 to 65 grams/10 minutes, preferably about 2 to 30 grams/10 minutes. The polycarbonates may be branched or unbranched; however, branching improves dimensional stability. It is contemplated that the polycarbonate may have various known end groups. These resins are known and are readily available in commerce.

One or more branching agents may also be used in making the polycarbonates of the invention. Branching agents, such as tri- and tetrafunctional phenols and carbonic acids, as well as bisphenols with carbonic acid side chains are typically used. An example might include 4,4'-dihydroxy-2,2-diphenylpropane or 1,4bis (4',4"-dihydroxytriphenylmethyl)benzene, and trisphenol TC. Nitrogen-containing branching agents are also used. Examples might include: cyanic chlorid and 3,3-bis(4-hydroxyphenyl)-2 -oxo-2,3-dihydroindole.

Polyester/polycarbonate blends suitable in the context certain embodiments of the present invention comprise:

(a) 1 to 99 weight % of a polyester, comprising a diacid residue component selected from the group consisting of aliphatic, alicyclic, and/or aromatic dicarboxylic acids, wherein the aromatic portion of said aromatic dicarboxylic acid has 6-20 carbon atoms, wherein the aliphatic or alicyclic portion of said aliphatic or alicyclic dicarboxylic acid has 3-20 carbon atoms, and a glycol residue component comprising from 45 mole % to 100 mole % 1,4-cyclohexanedimethanol, and, optionally, at least one additional aliphatic glycol having 2-20 carbon atoms; wherein the total mole percentages for the glycol component equals 100 mole %.

(b) 99 to 1 weight % of a polycarbonate;

wherein the total combined weight percentage of polyester and polycarbonate in the polyester/polycarbonate blend equals 100 weight %. Suitable polyester/polycarbonate blends are exemplified in U.S. Pat. No. 6,896,966.

In one embodiment the polyester/polycarbonate blend composition suitable in the present invention comprises 50-90 weight % by weight of the polyester and 50-10 weight % by weight of the polycarbonate. In another embodiment, the blend composition comprises 60-80 weight % polyester and 40-20 weight % by weight polycarbonate.

Polyesters particularly suitable in certain embodiments of the present invention are polyesters having repeating unit of the Formula III:

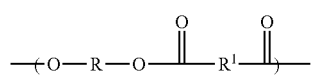

Formula III wherein R is the residue of 1,4 cyclohexanedimethanol or a mixture of 1,4 cyclohexanedimethanol and at least one aryl, alkane or cycloalkane containing diol having 2 to 20 carbon atoms; and wherein R1 is the decarboxylated residue derived from an aryl, aliphatic, or cycloalkane containing diacid of 3 to 20 carbon atoms. Examples of the diol portion, R, are ethylene glycol, 1,2-propylene glycol, 1,3-propanediol, 1,4-butanediol, 1,5-pentanediol, 1,6-hexanediol, 1,2- or 1,3-cyclohexanedimethanol, neopentyl glycol, and 2,2,4,4 tetramethyl-1,3-cyclobutanediol. In one embodiment the second glycol comprises ethylene glycol, and mixtures thereof. Examples of the diacid portion, R1, are malonic, succinic, glutaric, adipic, pimelic, suberic, azelaic, sebacic, dodecanedioic, 1,4-, 1,5-, and 2,6-decahydronaphthalenedicarboxylic acid, and cis- or trans-1,4-cyclohexanedicarboxylic acid. Examples of useful aromatic dicarboxylic acids are terephthalic acid, isophthalic acid, 4,4'-biphenyidicarboxylic, trans 3,3'-and trans 4,4 stilbenedicarboxylic acid, 4,4'-dibenzyldicarboxylic acid, 1,4-, 1,5'-, 2,3-, 2,6, and 2,7-naphthalenedicarboxylic acid. Chemical equivalents of these diacids, and within the scope of the present invention, include esters, alkyl esters, dialkyl esters, diaryl esters, anhydrides, salts, acid chlorides, acid bromides, and the like and are included within the scope of this invention. In certain embodiments of the present invention, the preferred dicarboxylic acids are terephthalic and isophthalic acid or mixtures thereof. In certain embodiments, the preferred chemical equivalent comprises dialkyl esters of terephthalic and isophthalic acid. Mixtures of any of these acids or equivalents may be used.

In certain embodiments of polyester/polycarbonate blends, polyesters useful within the scope of this invention comprise a polyester having from 40 to 100 mole %, more preferably 60 to 80 mole % of 1,4-cyclohexanedimethanol wherein the total mole percentages of the glycol component in the polyester equal 100 mole %. The remainder of the glycol component comprises any of the other glycols described herein but, in certain embodiments, preferably ethylene glycol in the amount of 0 to 60 mole %, more preferably, 20 to 40 mole %. Although any diacid as described herein may be used, 80 to 100mole % terephthalic acid is preferred for certain embodiment.

In another embodiment of polyester/polycarbonate blends, the polyester useful within the scope of this invention is a polyester having from 100 mole % 1,4-cyclohexanedimethanol wherein the total mole percentages of the glycol component in the polyester equal 100 mole %. Also, in this particular embodiment, it is preferred that isophthalic acid is present in the amount of 5 to 50 mole %, more preferably, 20 to 40 mole %. Although any diacid as described herein may be used, it is preferred in certain embodiments that terephthalic acid is present in the amount of 95 to 50 mole %.

Conventional polycondensation processes, well known in the art, are used to prepare the polyesters useful in the present invention. These include direct condensation of the acid(s) with the diol(s) or by ester interchange using lower alkyl esters. In one aspect, the inherent viscosity of the polyesters of the present invention may range from about 0.5 to about 1.2 dL/g, about 0.4 to about 1.0 dl/g or about 0.6 to about 0.9 dL/g at 25° C., measured by dissolving about 0.50 g of the polyester in about 100 mL of a solvent consisting of 60% by weight phenol and 40% by weight tetrachloroethane.

The polymerization reaction to form the polyesters useful in the present invention may be carried out in the presence of one or more conventional polymerization catalysts. Typical catalysts or catalyst systems for polyester condensation are well known in the art. Suitable catalysts are disclosed, for example, in U.S. Pat. Nos. 4,025,492, 4,136,089, 4,176,224, 4,238,593, and 4,208,527, the disclosures of which are herein incorporated by reference. Further, R. E. Wilfong, Journal of Polymer Science, 54, 385, (1961) describes typical catalysts, which are useful in polyester condensation reactions. Preferred catalyst systems include Ti, Ti/P, Mn/Ti/Co/P, Mn/Ti/P, Zn/Ti/Co/P, Zn/Al, and Li/Al. When cobalt is not used in the polycondensation, copolymerizable toners may be incorporated into the copolyesters to control the color of these copolyesters so that they are suitable for applications in which color may be an important property. In addition to the catalysts and toners, other conventional additives, such as antioxidants, dyes, etc., may be used in the copolyesterifications in typical amounts.

In certain embodiments, one or more branching agents may also be useful in making the polyesters useful in the present invention. The branching agent can be one which provides branching in the acid unit portion of the polyester, or in the glycol unit portion, or it can be a hybrid. Illustrative of such branching agents are polyfunctional acids, polyfunctional glycols and acid/glycol hybrids. Examples include, but are not limited to, tri or tetracarboxylic acids, such as trimesic acid, pyromellitic acid and lower alkyl esters thereof and the like, and tetrols such as pentaerythritol. Also triols such as trimethylolpropane or dihydroxy carboxylic acids and hydroxydicarboxylic acids and derivatives, such as dimethyl hydroxy terephthalate, and the like are useful within the context of this invention. Trimellitic anhydride is a preferred branching agent. The branching agents may be used either to branch the polyester itself or to branch the polyester/polycarbonate blend of the invention.

Polymer miscibility is defined herein as a polymer blend or mixture forming a single phase.

Miscible polymer blends useful in this invention were disclosed in Research Disclosure 22921, May, 1983, which concerns blends of polycarbonate with polyesters based on terephthalic acid and a mixture of 1,4-cyclohexanedimethanol and ethylene glycol. Similar miscible blends are disclosed in U.S. Pat. Nos. 4,786,692 and 5,478,896. Blends of polycarbonate with another family of polyesters, those based on a mixture of terephthalic and isophthalic acids with 1,4-cyclohexanedimethanol, are disclosed in U.S. Pat. Nos. 4,188,314 and 4,391,954. British Patent Specification 1,599,230 (published Jan. 16, 1980) discloses blends of polycarbonate with polyesters of 1,4-cyclohexanedimethanol and a hexacarbocyclic dicarboxylic acid. Mohn et al. reported on thermal properties of blends of polyesters based on 1,4-cyclohexanedimethanol and terephthalic acid or terephthalic/isophthalic acid mixtures with polycarbonate [J. Appl. Polym. Sci., 23, 575 (1979)].

The polyesters useful in certain embodiments of this invention maybe made by conventional melt processing techniques. For example, pellets of the polyester may be mixed with pellets of the polycarbonate and subsequently melt blended on either a single or twin screw extruder to form a homogenous mixture.

In one embodiment of the present invention, the laminate is made from sheet material from which the upper (or outer) layer or surface is formed generally has a thickness in the range of about 0.0015 to 0.25 inch, or about 0.0015 to 0.5 inch, or about 0.0015 to 1 inch, or 0.0015 to 2 inches, or about 0.005 to 0.25 inch, or about 0.005 to 0.5 inch, or about 0.005 to 1 inch, or 0.005 to 2 inches. The sheet material from which the lower (or backing) layer or surface is formed typically has a thickness in the range of 0.015-0.500 inch, preferably in the range of about 0.050-0.250 inch.

In one aspect of the present invention, the thermoplastic article of the present invention may be produced by subjecting the laminate to temperatures and pressures sufficient to cause the upper or lower sheet materials to bond (or fuse) around the object to be encapsulated. Although the upper and lower sheet may also bond to the object to be encapsulated, this is not required for the present invention. However, temperatures which cause decomposition, distortion, or other undesirable effects in the encapsulant should be avoided. Typically, the bonding temperatures are in the range of about 80 to 218° C. (176 to 425° F.), preferably in the range of about 82 to 200° C. (180 to 392° F.). For certain embodiments of the invention, the temperature has a lower limit of 80, 90, 100, 110, 120, 130, 140, 150, 160, 170, 180, 190, 200, 210, or 220° C. The temperature has an upper limit of 233, 220, 210, 200, 190, 180, 170, 160, 150, 140, 130, 120, 110, 100, or 90 C. For various embodiments of the invention the range of temperature may be any combination of the lower limit of temperature with any upper limit of temperature. The pressures utilized in the bonding or laminating of the thermoplastic article of the invention preferably are in the range of about 0.034 to 2.41 MPa (about 5 to 350 pounds per square inch gauge ("psig")). For certain embodiments of the invention, the pressure has a lower limit of 5, 10, 20, 30, 40, 50, 60, 70, 80, 90, 100, 110, 120, 130, 140, 150, 175, 200, 225, 250, 275, 300 or 325 psig. ). For certain embodiments of the invention, the pressure has an upper limit of 10, 20, 30, 40, 50, 60, 70, 80, 90, 100, 110, 120, 130, 140, 150, 175, 200, 225, 250, 275, 300, 325 or 350 psig. For various embodiments of the invention the range of pressure may be any combination of the lower limit of pressure with any upper limit of pressure.

In certain embodiments according to the present invention, the temperature at the interface of the laminated sheets ranges from about 100 to about 160° C., or from about 110 to about 160° C., or from about 120 to about 160° C., or about 130 to about 160° C., or about 140 to about 160° C., or about 150 to about 160° C. In certain embodiments, the temperature at the laminated sheets ranges from about 40 to about 80° C. above the Tg of at least one of the sheets, or from about 50 to about 80° C. above the Tg of at least one of the sheets, or from about 60 to about 80° C. above the Tg of at least one of the sheets, or from about 70 to about 80° C. above the Tg of at least one of the sheets.

In certain embodiments, the temperature at the interface of the laminated sheets ranges from about 10° C. below the Tg of at least one of the laminated sheets to about 80° C. above the Tg of at least one of the laminated sheets. In certain embodiments, the temperature at the interface of the laminated sheets ranges from about 10° C. below the Tg of at least one of the laminated sheets to about 80° C. above the Tg of both of the laminated sheets.

In certain embodiments according to the present invention, the temperature at the interface of the laminated sheets is maintained at the desired setpoint for a time ranging from about 0.5 minutes to about 1.5 minutes, or 0.5 minutes to about 2.0 minutes, or 0.5 to about 3 minutes or, about 0.5 minutes to 4.0 minutes. In certain embodiments according to the present invention, the temperature at the interface of the laminated sheets is maintained at the desired setpoint for a time ranging from about 5 minutes to about 10 minutes, or 10 minutes to about 20 minutes, or 10 to about 30 minutes or, about 10 minutes to 40 minutes.

In other embodiments according to the present invention, the temperature at the interface of the laminated sheets is maintained at the desired setpoint for a time ranging from about 0.5 minutes to about 120 minutes, or 0.5 minutes to about 60 minutes, or 0.5 to about 45 minutes or, about 0.5 minutes to 30 minutes. In other embodiments according to the present invention, the temperature at the interface of the laminated sheets is maintained at the desired setpoint for a time ranging from about 1 minute to about 120 minutes, or 1 minute to about 60 minutes, or 1 minute to about 45 minutes or, about 1 minute to 30 minutes. In other embodiments according to the present invention, the temperature at the interface of the laminated sheets is maintained at the desired setpoint for a time ranging from about 5 minutes to about 120 minutes, or 5 minutes to about 60 minutes, or 5 minutes to about 45 minutes or, about 5 minutes to 30 minutes. In other embodiments according to the present invention, the temperature at the interface of the laminated sheets is maintained at the desired setpoint for a time ranging from about 10 minutes to about 120 minutes, or 10 minutes to about 60 minutes, or 15 to about 45 minutes or, about 15 minutes to 30 minutes.

In certain embodiments according to the present invention, the pressure on the laminate sheets ranges from about 20 to about 400 psig, or about 40 to 400 psig, or about 50 psig to about 400 psig, or about 20 to about 150 psig, or about 40 to about 150 psig.

The temperature for bonding the thermoplastic articles will vary depending, for example, on the particular material or blend employed and the thickness of the sheet materials used, and may be determined by those skilled in the art using the disclosures herein. The pressure will vary depending on the pressure sensitivity of the object being encapsulated. Certain pressure sensitive panels, as an example, can be pressed at approximately 0.10 MPa (15 psi). The laminate is held at the appropriate temperature and pressure for about 5 to 45 minutes, or until such time as a bond is formed between the upper and lower sheet materials. After 5 to 45 minutes, the bonded/fused thermoplastic article is allowed to cool under pressures from about 0.034 to 2.41 MPa (about 5 to 350 psi), preferably about 0.10 MPa (15 psi), until it cools below the glass transition temperature of the sheet material. In certain embodiments according to the present invention, during the bonding process, the sheet material may be bonded or fused to the object to be encapsulated without the use of an adhesive.

For certain embodiments, the residence times of 5 to 45 minutes are generally applicable to single laminates layup configurations. Multiple laminate layups, stacked vertically and separated by release papers and caul plates, can also be constructed such that multiple laminates are produced in just one heated platen opening. The residence times for these multiple layup configurations may exceed 45 minutes. Proper residence times for multiple layup configurations may be determined by one of ordinary skill using the disclosures herein. The lower limit of residence time may be 5, 10, 15, 20, 25, 30, or 40 minutes. The upper limit of residence time may be 45, 40, 35, 30, 25, 20, 15, or 10 minutes. For various embodiments of the invention the range of residence times may be any combination of the lower limit of residence time with any upper limit of residence time.

One aspect of the current invention involves the use of relatively low forces in the thermocompressive lamination of pressure-sensitive structures which may cause air entrapment. Typical air removal methods include lamination under a vacuum; pre-drying the raw materials; or creating channels for air escape, such as a matte texture on the sheet surface, matte textured release paper, or including a "glass sheen" PET fabric (available from Danzian) between areas prone to air entrapment. For thicker panels (about 10 mils or thicker), polymeric thin film shims can be added around the article to be encapsulated to further aid air removal. When using matte sheet, place the matte side facing the encapsulated item. The target "Ra" or surface roughness measurement should be about 90 micro inches, where the preferred surface roughness value depends on the type of inclusion being encapsulated.

For temperature-sensitive objects, additional insulating layers can be added to further protect the sensitive portions of the panel. The insulating layers may be an interior layer that becomes a part of the finished laminated panel or the insulating layers may be external layers that are removed when the laminated panel is removed from the lamination press.

The upper and lower sheet materials used in the manufacture of the thermoplastic articles of the present invention may be the same or different. For example, the upper and lower sheet materials may be produced from different polyesters or polyester/polycarbonate blends (as defined herein) or compositions that contain different additives. When the upper and lower sheet materials are produced from chemically dissimilar materials, the dissimilar materials must be thermally compatible. As used herein, the term "thermal compatibility" means that when layers of the sheet materials are bonded together under conditions of elevated temperature and pressure, the layers undergo approximately equal thermal expansion or contraction such that the solid surface is substantially planar.

The polyesters or polyester/polycarbonate blends useful in various embodiments of the invention may contain impact modifiers, stabilizers, nucleating agents, extenders, flame retarding agents, reinforcing agents, fillers, antistatic agents, antimicrobial agents, antifungal agents, self-cleaning or low surface energy agents, mold release agents, scents, colorants, antioxidants, extrusion aids, slip agents, release agents, carbon black, and other pigments, and the like, all and mixtures thereof which are known in the art for their utility in polyesters or polyester/polycarbonate blends. In particular, the use of phosphorous based stabilizers for further color reductions, if needed, is well known in the art.

Some encapsulants may have sensitivity to moisture when exposed to outdoor environments. In addition to pre-drying the raw materials, the encapsulation of additional moisture barriers, such as a layer of EVOH and the like, may be required beyond the copolyesters sheeting already present. These barrier layers can be added to the laminate layup as either a film or co-extruded directly onto the plastic sheeting. Desiccants or other hydrophilic moisture scavengers can also be encapsulated with the panels.

The composition and blends thereof constituting the sheet materials used in the manufacture of the articles and sheeting of the present invention may not be as hard or scratch resistant as may be necessary or desired for certain end uses. For example, an end use in which the exterior surface of the thermoplastic article may be subjected to scratching or abrasion, i.e., in a wall decoration, may require the application of an abrasion-resistant coating to the exterior surface. For example, films consisting of fluorinated hydrocarbons, poly (perfluoroethylene) such as TEDLAR from DuPont Chemical Company or oriented poly(ethylene terephthalate) such as MYLAR from DuPont Chemical Company may be used to improve both chemical and abrasion resistance.

The abrasion resistant film typically has a thickness in the range of about 0.025 to 0.254 mm (0.001-0.01 inch), preferably about 0.051 to 0.178 mm (0.002-0.007 inch), and most preferably about 0.076 mm (0.003 inch). However, abrasion resistant film thinner or thicker than these ranges may be used since the thickness of such film is limited only by the equipment available cost and functionality considerations. An adhesive optionally may be used between the thermoplastic sheet and the abrasion resistant film. The abrasion resistant film may be coating that is UV or thermally cured on a linear or branched polymer and then laminated to polymer sheeting to provide surface protection.

Alternatively, an abrasion resistant coating may be applied to a branched or linear polymer plastic film and then the film bearing the abrasion resistant, coating may be laminated to one or both sides of the article of the present invention. The film may be selected from a number of thermoplastic materials compatible with the lamination process such as poly (vinyl chloride), PETG copolyester, poly(ethylene terephthalate), poly(methyl methacrylate), polycarbonate, polyester/polycarbonate blends, and the like.

For certain embodiments, the film thickness may range from 0.0025-0.381 mm (0.001-0.015 inch) with a thickness of 0.0762-0.203 mm (0.003-0.008) being most preferred. The coating may be selected from a number of commercially-available materials such as polyurethanes, fluorinated polyurethanes and silicones which are cured by heat or they may be selected from materials that are cured by ultraviolet (UV) or electron beam (EB) radiation. Such UV/EB cured materials fall under the general class of acrylates and modified acrylates that contain fluorine, silicone, epoxy, polyester, polyether or caprolactone residues or functional groups. The particular coating material selected will depend primarily on the degree of abrasion resistance required. Application of the liquid, heat- or UV/EB-curable precursor of the abrasion resistant coating may be carried out according to conventional procedures and usually is accomplished on a roll coating machine. The thickness of the coating applied to a film generally is 0.0076-0.051 mm (0.0003-0.002 inch) with thickness of about 0.0127 mm (0.0005 inch) being most preferred. Primers or tie layers can also be used between the hardcoat and film layer to promote adhesion.

These coatings may be applied in a manner similar to the application of paints. The coatings exist either as predominantly undiluted material with very little volatile content or as solvent- or water-based materials. In addition to being applied to a film that can be laminated to the structure as part of the process, they may be applied directly to the finished product. Application may be carried out by a variety of techniques such as roll, paint, spray, mist, dip and the like.

The thermoplastic article or laminate, based on polyesters or polyester/polycarbonate blends, can be subsequently shaped and thermoformed into a variety of useful products. As an illustrative example, the thermoplastic article can be thermoformed or otherwise shaped into curved signage, safety vests, flooring, shower doors, privacy partitions, and tabletops and other furniture pieces. Depending on the nature of the device, the thermoplastic articles of this invention may be formed, heat draped, or molded. In addition, the articles of the present invention have an appealing appearance with low density to facilitate transport and installation of building materials produced there from.

The composition and blends thereof constituting the sheet materials used in the manufacture of the articles and sheeting of the present invention may not be as hard or scratch resistant as necessary or desired for certain end uses. For example, an end use in which the exterior surface of the thermoplastic article may be subjected to scratching or abrasion, i.e., in a wall decoration, may require the application of an abrasion-resistant coating to the exterior surface. For example, films consisting of fluorinated hydrocarbons, poly(perfluoroethylene) such as TEDLAR from duPont Chemical Company or oriented poly(ethylene terephthalate) such as MYLAR from duPont Chemical Company may be used to improve both chemical and abrasion resistance. The abrasion resistant film typically has a thickness in the range of about 0.025 to 0.254 mm (0.001-0.01 inch), preferably about 0.051 to 0.178 mm (0.002-0.007 inch), and most preferably about 0.076 mm (0.003 inch). However, abrasion resistant film thinner or thicker than these ranges may be used since the thickness of such film is limited only by the equipment available cost and functionality considerations. An adhesive optionally may be used between the thermoplastic sheet and the abrasion resistant film.

Alternatively, an abrasion resistant coating may be applied to a plastic film and then the film bearing the abrasion resistant coating may be laminated to one or both sides of the article of the present invention. The film may be selected from a number of thermoplastic materials compatible with the lamination process such as poly(vinyl chloride), PETG copolyester, poly(ethylene terephthalate), poly(methyl methacrylate), polycarbonate, miscible polyester/polycarbonate blends, and the like.

The film thickness for the coatings may range from 0.0025-0.381 mm (0.001-0.015 inch) with a thickness of 0.0762-0.203 mm (0.003-0.008) being most preferred. The coating may be selected from a number of commercially-available materials such as polyurethanes, fluorinated polyurethanes and silicones which are cured by heat or they may be selected from materials that are cured by ultraviolet (UV) or electron beam (EB) radiation. Such UV/EB cured materials fall under the general class of acrylates and modified acrylates that contain fluorine, silicone, epoxy, polyester, polyether or caprolactone residues or functional groups. The particular coating material selected will depend primarily on the degree of abrasion resistance required. Application of the liquid, heat- or UV/EB-curable precursor of the abrasion resistant coating may be carried out according to conventional procedures and usually is accomplished on a roll coating machine. The thickness of the coating applied to a film generally is 0.0076-0.051 mm (0.0003-0.002 inch) with thickness of about 0.0127 mm (0.0005 inch) being most preferred. Primers or tie layers can also be used between the hardcoat and film layer to promote adhesion.

EXAMPLES

Figure 2:
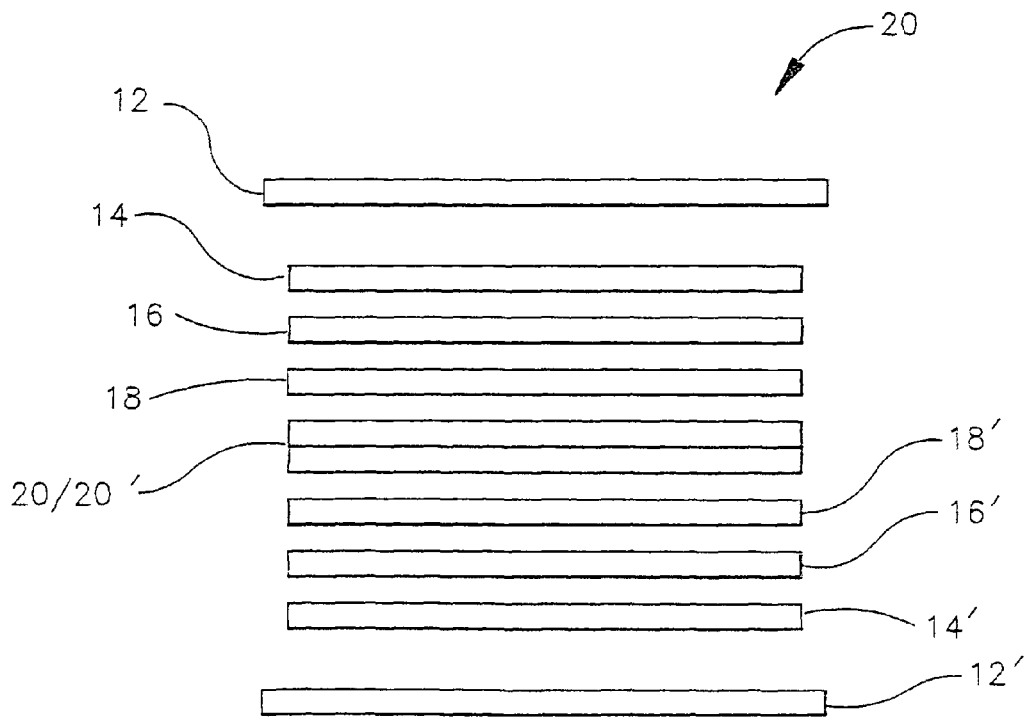
FIG. 2 is a side view of an encapsulation layup.

To understand the effect of branching on flow behavior, an experiment was designed to observe flow as a function of processing conditions (temperature, time, and pressure). The temperature was set at 120, 140 and 160C. The pressure is calculated from the ram force divided by the total area. The ram force was set at 7000, 14000, and 21000 lbs resulting in pressures of 48 lbs/sq in, 97 lbs/sq in, and 146 lbs/sq inch when laminating a 12 inch by 12 inch sample. The time is specified at 30, 60, and 90 seconds and the timer starts when the interface between the two sheets of material is within 10C of the setpoint temperature as measured by a thermocouple inserted between two film/sheets of polymer being laminated. In every case, samples of like material were laminated to each other. The sheets were 0.118 inches thick. FIG. 1 shows the top view of a laminate stack (S) and the l axis and w axis along which the length and width of the sheets were measured. The flow was measured by using a set of calipers and measuring dimensional changes in the middle of the sheet in both the l (length) and w (width) directions as seen in FIG. 1. From this, the area was calculated by multiplying the length by the width. The change in area was calculated by subtracting the initial area from the final area. Using. The layup, also referred to as a book, typical of a laminate stack (S) is illustrated in FIG. 2. In FIG. 2 the layers of a representative stack include buckeye paper (a), a rubber mat (b), a polished plate (c), release paper (d), two polymer/polymer laminate layers (e, e'), release paper (d'), a polished plate (c'), a rubber mat (b'), and buckeye paper (a'). The data is summarized in Table 1.

BACKGROUND ON MATERIALS

SPECTAR™ is an amorphous copolyester containing 1,4-cyclohexanedimethanol as a comonomer.

PROVISTA™ is an amorphous copolyester containing 1,4-cyclohexanedimethanol as a comonomer and timellitic anhydride as a branching agent.

Example 1

Spectar and Provista were individually laminated at 120° C., 7000 lbs of ram force, for a time of 30 seconds heating after reaching a temperature within 10° C. of the setpoint. For Spectar, the initial area was 144.3 square inches and increased to a final area of 147.0 square inches resulting in an area increase of 2.7 square inches. For Provista, the initial area was 144.4 square inches and increased to a final area 146.5 square inches resulting in an area increase of 2.1 square inches.

Example 2

Spectar and Provista were individually laminated at 120° C., 21000 lbs of ram force, for a time of 30 seconds heating after reaching a temperature within 10° C. of the setpoint. For Spectar, the initial area was 137.6 square inches and increased to a final area of 142.9 square inches resulting in an area increase of 5.3 square inches. For Provista, the initial area was 144.5 square inches and increased to a final area 148.4 square inches resulting in an area increase of 3.9 square inches.

Example 3

Spectar and Provista were individually laminated at 120° C., 7000 lbs of ram force, for a time of 90 seconds heating after reaching a temperature within 10° C. of the setpoint. For Spectar, the initial area was 144.2 square inches and increased to a final area of 147.0 square inches resulting in an area increase of 2.8 square inches. For Provista, the initial area was 144.1 square inches and increased to a final area 146.7 square inches resulting in an area increase of 2.6 square inches.

Example 4

Spectar and Provista were individually laminated at 120° C., 21000 lbs of ram force, for a time of 90 seconds heating after reaching a temperature within 10° C. of the setpoint. For Spectar, the initial area was 144.3 square inches and increased to a final area of 150.3 square inches resulting in an area increase of 6.0 square inches. For Provista, the initial area was 143.2 square inches and increased to a final area 147.7 square inches resulting in an area increase of 4.5 square inches.

Example 5

Spectar and Provista were individually laminated at 140° C., 7000 lbs of ram force, for a time of 30 seconds heating after reaching a temperature within 10° C. of the setpoint. For Spectar, the initial area was 144.4 square inches and increased to a final area of 160.8 square inches resulting in an area increase of 16.4 square inches. For Provista, the initial area was 143.1 square inches and increased to a final area 151.1 square inches resulting in an area increase of 7.9 square inches.

Example 6

Spectar and Provista were individually laminated at 140° C., 21000 lbs of ram force, for a time of 30 seconds heating after reaching a temperature within 10° C. of the setpoint. For Spectar, the initial area was 144.3 square inches and increased to a final area of 170.8 square inches resulting in an area increase of 26.5 square inches. For Provista, the initial area was 144.4 square inches and increased to a final area 161.8 square inches resulting in an area increase of 17.4 square inches.

Example 7

Spectar and Provista were individually laminated at 140° C., 16000 lbs of ram force, for a time of 60 seconds heating after reaching a temperature within 10° C. of the setpoint. For Spectar, the initial area was 144.4 square inches and increased to a final area of 170.8 square inches resulting in an area increase of 26.5 square inches. For Provista, the initial area was 143.4 square inches and increased to a final area 160.1 square inches resulting in an area increase of 16.7 square inches.

Example 8

Spectar and Provista were individually laminated at 140° C., 7000 lbs of ram force, for a time of 90 seconds heating after reaching a temperature within 10° C. of the setpoint. For Spectar, the initial area was 144.2 square inches and increased to a final area of 165.5 square inches resulting in an area increase of 21.3 square inches. For Provista, the initial area was 138.1 square inches and increased to a final area 150.1 square inches resulting in an area increase of 12.0 square inches.

Example 9

Spectar and Provista were individually laminated at 140° C., 21000 lbs of ram force, for a time of 90 seconds heating after reaching a temperature within 10° C. of the setpoint. For Spectar, the initial area was 145.2 square inches and increased to a final area of 180.1 square inches resulting in an area increase of 34.9 square inches. For Provista, the initial area was 144.3 square inches and increased to a final area 168.8 square inches resulting in an area increase of 24.5 square inches.

Example 10

Spectar and Provista were individually laminated at 160° C., 7000 lbs of ram force, for a time of 30 seconds heating after reaching a temperature within 10° C. of the setpoint. For Spectar, the initial area was 144.4 square inches and increased to a final area of 184.6 square inches resulting in an area increase of 40.1 square inches. For Provista, the initial area was 143.2 square inches and increased to a final area 166.2 square inches resulting in an area increase of 22.9 square inches.

Example 11

Spectar and Provista were individually laminated at 160° C., 21000 lbs of ram force, for a time of 30 seconds heating after reaching a temperature within 10° C. of the setpoint. For Spectar, the initial area was 144.5 square inches and increased to a final area of 213.1 square inches resulting in an area increase of 68.7 square inches. For Provista, the initial area was 144.3 square inches and increased to a final area 194.7 square inches resulting in an area increase of 50.4 square inches.

Example 12

Spectar and Provista were individually laminated at 160° C., 7000 lbs of ram force, for a time of 90 seconds heating after reaching a temperature within 10° C. of the setpoint. For Spectar, the initial area was 144.5 square inches and increased to a final area of 201.4 square inches resulting in an area increase of 57.0 square inches. For Provista, the initial area was 143.2 square inches and increased to a final area 177.8 square inches resulting in an area increase of 34.6 square inches.

Example 13

Prophetic

A UV copolyester film is laminated to the top surface of a two sheets of polymer and the entire structure is laminated according to the layup described above and process conditions described in example 1. The use of a branched polymer resulted in less flow and less thinning of both the UV film and the sheet thereby saving cost and waste in material utilization while maintaining optimum performance. The optimum performance is maintained because the UV film flows and becomes thinner resulting in poor weathering as the layer thickness decreased too much to protect the laminate.

Example 14

Prophetic

A graphics film is an inclusion between two sheets of polymers and laminated according to the layup described above and process conditions described in example 1. The use of a branched polymer resulted in less flow and no distortion to the graphic. When using non-branched polymers, the polymer flows more and distorts the graphic.

Example 15

Prophetic

A paper inclusion is inserted between two sheets of polymers and laminated according to the layup described above and process conditions described in example 1. When using the branched resins, the polymers do not flow as much and the paper inclusion does not tear or distort. When using non branched resins, the paper inclusion is damaged by the lamination process.

TABLE 1

| | Setup Conditions | | | SPECTAR | | | | PROVISTA | | | |
|---|---|---|---|---|---|---|---|---|---|---|---|
| Example # | Temp (° C.) | Time (seconds) | Ram Force (lbs) | Pressure (lbs/in$^2$) | Init Area (in$^2$) | Final Area (in$^2$) | Δ Area (in$^2$) | Pressure (lbs/in$^2$) | Init Area (in$^2$) | Final Area (in$^2$) | Δ Area (in$^2$) |
| 1 | 120 | 30 | 7000 | 48.5 | 144.3 | 147.0 | 2.8 | 48.5 | 144.4 | 146.5 | 2.2 |
| 2 | 120 | 30 | 21000 | 152.6 | 144.6 | 142.9 | 5.3 | 145.3 | 144.5 | 148.4 | 3.9 |
| 3 | 120 | 90 | 7000 | 48.6 | 144.2 | 147.0 | 2.8 | 48.6 | 144.1 | 146.7 | 2.6 |
| 4 | 120 | 90 | 21000 | 145.5 | 144.3 | 150.3 | 6.0 | 146.7 | 143.2 | 147.7 | 4.5 |
| 5 | 140 | 30 | 7000 | 48.5 | 144.4 | 160.8 | 16.4 | 48.9 | 143.1 | 151.1 | 7.9 |
| 6 | 140 | 30 | 21000 | 145.5 | 144.3 | 170.8 | 26.5 | 145.4 | 144.4 | 161.8 | 17.4 |
| 7 | 140 | 60 | 14000 | 97.0 | 144.4 | 170.8 | 26.5 | 97.6 | 143.4 | 160.1 | 16.7 |
| 8 | 140 | 90 | 7000 | 48.5 | 144.2 | 165.5 | 21.3 | 50.7 | 138.1 | 150.1 | 12.0 |
| 9 | 140 | 90 | 21000 | 144.6 | 145.2 | 180.1 | 34.9 | 145.6 | 144.3 | 168.8 | 24.5 |
| 10 | 160 | 30 | 7000 | 48.5 | 144.4 | 184.6 | 40.1 | 48.9 | 143.2 | 166.2 | 22.9 |
| 11 | 160 | 30 | 21000 | 145.4 | 144.5 | 213.1 | 68.7 | 145.5 | 144.3 | 194.7 | 50.4 |
| 12 | 160 | 90 | 7000 | 48.5 | 144.5 | 201.4 | 57.0 | 48.9 | 143.2 | 177.8 | 34.6 |

The data show consistently less flow of the laminate sheets when branched resins are used. This will result in less distortion of interlayer materials and better retention of hard coated or UV surface layers. The use of branched polymers whether polyesters, polycarbonates, blends etc. results in less flow during the lamination process and better overall dimensional stability. This improvement leads to a reduction cycle time and reduced material waste while also protecting appearance and function of inclusions and functional surface layers.

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated.

The invention claimed is:

1. A method of making a laminated article, the method comprising:
   (a) providing a first layer and a second layer, each layer independently comprising a copolyester layer wherein at least one the layers further comprises a branching agent,
   (b) providing an inclusion between the first and second layer,
   (c) applying pressure ranging from about 20 to about 400 psig at a temperature ranging from about 20° C. to about 80° C. above the glass transition (Tg) of at least one layer of the copolyester,
   wherein the temperature at an interface of the first layer and the second layer is equal to or greater than the Tg of at least one of the first layer and the second layer and the temperature is maintained for a period of time sufficient ranging from about 0.5 to 4 minutes and a pressure ranging from about 30 to 250 psig to form the laminated article,
   wherein the copolyester has an inherent viscosity (IV) ranging from about 0.5 to about 1.2 dL/g, when measured at 25° C. using 0.50 grams of polymer per 100 mL of a solvent consisting of 60 weight percent phenol and 40 weight percent tetrachloroethane, and
   wherein during the lamination, the reduction in flow of the first layer and the second layer, as measured by the change of area of the of the first and second copolyester layers with the branching agent relative to the same first and second copolyster layers without the branching agent, is more than about 15%.

2. The method according to claim 1, wherein the temperature is maintained for a period ranging from about 0.5 minutes to about 120 minutes.

3. The method according to claim 1, wherein each copolyester layer further comprises a branching agent.

4. The method according to claim 1, wherein the first and second polyester layers have a flow during lamination less than the flow that induces defects in the inclusion.

5. The method according to claim 1, wherein the temperature at an interface of the first layer and the second layer is equal to or greater than the Tg of the first layer and the second layer.

6. The method according to claim 1, wherein the copolyester comprises:
   (i) diacid residues comprising at least 80 mole percent terephthalic acid residues; and
   (ii) diol residues comprising from 98 to 1 mole percent ethylene glycol residues and from 2 to 99 mole percent residues derived from 1,3- or, 1,4-cyclohexanedimethanol, wherein the ethylene glycol and cyclohexanedimethanol residues constitute at least 80 mole percent of the diol residues.

7. The method according to claim 1, wherein the copolyester comprises:
   (i) a dicarboxylic acid component comprising repeat units from at least 80 mole % of terephthalic acid or dimethyl terephthalate; and
   (ii) a diol component comprising repeat units from 98 to 1 mole % ethylene glycol and 2 to 99 mole % cyclohexanedimethanol, based on 100 mole % dicarboxylic acid and 100 mole % diol.

8. The method according to claim 1, wherein the copolyester comprises:
   (i) a dicarboxylic acid component comprising repeat units from at least 80 mole percent of terephthalic acid or dimethyl terephthalate; and
   (ii) a diol component comprising repeat units from ethylene glycol and 2 to 99 mole percent of cyclohexanedimethanol, based on 100 mole percent dicarboxylic acid and 100 mole percent diol.

9. The method according to claim 1, wherein the copolyester comprises:
   (i) diacid residues consisting essentially of terephthalic acid residues; and
   (ii) diol residues consisting essentially of ethylene glycol residues and 1,4-cyclohexanedimethanol residues wherein the mole ratio of ethylene glycol residues: 1,4-cyclohexanedimethanol residues is about 10:90 to about 90:10,
   wherein the copolyester has an inherent viscosity of 0.5 to 1.2 dL/g, when measured at 25° C. using 0.50 grams of polymer per 100 mL of a solvent consisting of 60 weight percent phenol and 40 weight percent tetrachloroethane.

10. The method according to claim 9, wherein the branching agent comprises trimesic acid, trimellitic acid, citric acid, tartaric acid, trimellitic anhydride, pyromellitic dianhydride, trimethylolpropane, glycerol, pentaerythritol, citric acid, tartaric acid, 3-hydroxyglutaric acid or mixtures thereof.

11. The method according to claim 1, wherein the branching agent comprises a multifunctional acids or multifunctional alcohol having at least three acid or alcohol groups.

12. The method according to claim 1, wherein the branching agent comprises an epoxide.

13. The method according to claim 1, wherein the epoxide comprises glycidyl methacrylate.

14. The method according to claim 1, wherein the branching agent comprises a dendritic polymer.

15. The method according to claim 1, wherein the branching agent comprises about 0.05 to about 0.25 wt % of the polyester layer, based on the total weight of the polyester layer and the branching agent.

16. The method according to claim 1, wherein the inclusion comprises fabric, metallic wire, rod, bar, wood, stone, paper, printed images, photographic images, colored film, vegetation, wood, wood chips, grasses, thatch, flowers, bamboo, tree or bush branches or stems, willow reed leaves, beans, flower petals, wheat, grains, papers, glass, crushed glass, glass fibers, mineral fibers, natural fibers, pebbles or combinations thereof.

17. A laminated article comprising:
   (a) a first layer and a second layer, each layer independently comprising a copolyester layer wherein at least one layer further comprises a branching agent,
   (b) an inclusion between the first and second layer, wherein the article is obtained by applying pressure ranging from about 20 to about 400 psig at a temperature ranging from about 20° C. to about 80° C. above the Tg of at least one layer,
   wherein the temperature at an interface, during lamination, of the first layer and the second layer is equal to or greater than the Tg of at least one of the first layer and the second layer for a period of time sufficient ranging from about 0.5 to 4 minutes and a pressure ranging from about 30 to 250 psig to form the laminated article, and
   wherein during the lamination, the reduction in flow of the first layer and the second layer, as measured by the change of area of the of the first and second copolyester layers with the branching agent relative to the same first and second copolyester layers without the branching agent, is more than about 15%.

18. The article according to claim 17, wherein the period of time ranges from about 0.5 minutes to about 120 minutes to form the laminated article.

19. The article according to claim 17, wherein each copolyester layer further comprises a branching agent.

20. The article according to claim 17, wherein the first and second polyester layers have a flow during lamination less than the flow that induces defects in the inclusion.

21. The article according to claim 17, wherein the temperature at an interface of the first layer and the second layer is equal to or greater than the Tg of the first layer and the second layer.

22. The article according to claim 17, wherein the copolyester comprises:
   (i) diacid residues comprising at least 80 mole percent terephthalic acid residues; and
   (ii) diol residues comprising from 98 to 1 mole percent ethylene glycol residues and from 2 to 99 mole percent residues derived from 1,3- or, 1,4- cyclohexanedimethanol, wherein the ethylene glycol and cyclohexanedimethanol residues constitute at least 80 mole percent of the diol residues.

23. The article according to claim 17, wherein the copolyester comprises:
   (i) a dicarboxylic acid component comprising repeat units from at least 80 mole % of terephthalic acid or dimethyl terephthalate; and
   (ii) a diol component comprising repeat units from 98 to 1 mole % ethylene glycol and 2 to 99 mole % cyclohexanedimethanol, based on 100 mole % dicarboxylic acid and 100 mole % diol.

24. The article according to claim 17, wherein the copolyester comprises:
   (i) a dicarboxylic acid component comprising repeat units from at least 80 mole percent of terephthalic acid or dimethyl terephthalate; and
   (ii) a diol component comprising repeat units from ethylene glycol and 2 to 99 mole percent of cyclohexanedimethanol, based on 100 mole percent dicarboxylic acid and 100 mole percent diol.

25. The article according to claim 17, wherein the copolyester comprises:

(i) diacid residues consisting essentially of terephthalic acid residues; and
(ii) diol residues consisting essentially of ethylene glycol residues and 1,4-cyclohexanedimethanol residues wherein the mole ratio of ethylene glycol residues: 1,4-cyclohexanedimethanol residues is about 10:90 to about 90:10, wherein the copolyester has an inherent viscosity of 0.5 to 1.2 dL/g, when measured at 25° C. using 0.50 grams of polymer per 100 mL of a solvent consisting of 60 weight percent phenol and 40 weight percent tetrachloroethane.

26. The article according to claim 17, wherein the branching agent comprises a multifunctional acids or multifunctional alcohol having at least three acid or alcohol groups.

27. The article according to claim 26, wherein the branching agent comprises trimesic acid, trimellitic acid, citric acid, tartaric acid, trimellitic anhydride, pyromellitic dianhydride, trimethylolpropane, glycerol, pentaerythritol, citric acid, tartaric acid, 3-hydroxyglutaric acid or mixtures thereof.

28. The article according to claim 17, wherein the branching agent comprises an epoxide.

29. The article according to claim 17, wherein the epoxide comprises glycidyl methacrylate.

30. The article according to claim 17, wherein the branching agent comprises a dendritic polymer.

31. The article according to claim 17, wherein the branching agent comprises about 0.05 to about 0.75 wt % of the polyester layer, based on the total weight of the polyester layer and the branching agent.

32. The article according to claim 17, wherein the inclusion comprises fabric, metallic wire, rod, bar, wood, stone, paper, printed images, photographic images, colored film, vegetation, wood, wood chips, grasses, thatch, flowers, bamboo, tree or bush branches or stems, willow reed leaves, beans, flower petals, wheat, grains, papers, glass, crushed glass, glass fibers, mineral fibers, natural fibers, pebbles or combinations thereof.

* * * * *